(12) United States Patent
Ushijima

(10) Patent No.: US 8,968,894 B2
(45) Date of Patent: Mar. 3, 2015

(54) POWER SUPPLY DEVICE

(71) Applicant: GS Yuasa International Ltd., Kyoto-shi (JP)

(72) Inventor: Osamu Ushijima, Kyoto (JP)

(73) Assignee: GS Yuasa International Ltd., Kyoto-shi, Kyoto (JP)

(*) Notice: Subject to any disclaimer, the term of this patent is extended or adjusted under 35 U.S.C. 154(b) by 112 days.

(21) Appl. No.: 13/727,479

(22) Filed: Dec. 26, 2012

(65) Prior Publication Data

US 2013/0171478 A1 Jul. 4, 2013

(30) Foreign Application Priority Data

Dec. 28, 2011 (JP) ................................. 2011-287552
Nov. 22, 2012 (JP) ................................. 2012-256673

(51) Int. Cl.
H01M 14/00 (2006.01)
H01M 2/10 (2006.01)
H01M 10/42 (2006.01)
H01G 11/76 (2013.01)

(52) U.S. Cl.
CPC .......... *H01M 2/1016* (2013.01); *H01M 10/425* (2013.01); *H01G 11/76* (2013.01); *Y02E 60/13* (2013.01)
USPC ............................................................ 429/7

(58) Field of Classification Search
USPC .............................................. 429/7, 100, 159
See application file for complete search history.

(56) References Cited

U.S. PATENT DOCUMENTS

| 8,551,631 B2* | 10/2013 | Tanahashi et al. | 429/71 |
| 8,691,412 B2* | 4/2014 | Yonishi | 429/100 |
| 2008/0286641 A1* | 11/2008 | Yonishi | 429/100 |
| 2008/0305390 A1* | 12/2008 | Naito | 429/159 |
| 2010/0099023 A1* | 4/2010 | Kuroda et al. | 429/159 |
| 2012/0244422 A1* | 9/2012 | Ushijima | 429/176 |
| 2013/0136963 A1* | 5/2013 | Chiba | 429/61 |

FOREIGN PATENT DOCUMENTS

| JP | 10-223201 A | 8/1998 |
| JP | 2002-134078 A | 5/2002 |

* cited by examiner

*Primary Examiner* — Stewart Fraser
(74) *Attorney, Agent, or Firm* — McGinn IP Law Group, PLLC

(57) ABSTRACT

A power supply device includes: a power storage element having an electrode terminal; and a fixing portion fixed to the power storage element on a second surface of the power storage element which is different from a first surface on which the electrode terminal is arranged. The fixing portion has a connection terminal for electrically connecting the electrode terminal and an external load.

14 Claims, 9 Drawing Sheets

POWER SUPPLY DEVICE

BACKGROUND OF THE INVENTION

1. Field of the Invention

The present invention relates to a power supply device including a plurality of stacked secondary batteries for example.

2. Description of the Related Art

A secondary battery is not only used for replacement of a primary battery but also widely used as a power supply of electronic devices such as mobile phones and IT devices. Especially, due to high-energy density, a non-aqueous electrolyte secondary battery represented by a lithium ion battery is increasingly applied to electric automobiles and industrial large-scale electric devices. Therefore, conventionally, in order to obtain higher voltage, a collective battery in which a plurality of non-aqueous electrolyte secondary batteries is stacked so as to form one power supply is proposed (for example, refer to JP-A-2002-134078).

However, a configuration of the collective battery according to the above conventional technique includes the following problem.

FIG. 9 is an exploded perspective view used to explain a problem of the collective battery formed by a plurality of batteries according to the conventional technique. As shown in FIG. 9, a collective battery 100 includes an assembled battery 110, an open box shape container 120 having an opening 121, and a lid 130.

The assembled battery 110 is a stack in which a plurality of batteries 111 having a hexahedral outer shape is arranged in such a manner that front surfaces and back surfaces face each other. In the batteries 111, electrodes 112 having different polarities from each other are connected by a bus bar 113. Thereby, the batteries 111 are connected in series so as to form a high-voltage assembled battery as a whole.

The assembled battery 110 is accommodated in the container 120, and the opening 121 of the container 120 is sealed by the lid 130. An electrode terminal 112a serving as a positive electrode and an electrode terminal 112b serving as a negative electrode for the entire assembled battery 110 are respectively electrically connected to a positive electrode terminal 131a and a negative electrode terminal 131b provided on an upper surface 130a of the lid 130. Thereby, the power of the assembled battery 110 is taken out as the power of the collective battery 100.

An electric current discharged by the assembled battery 110 is as large as tens to hundreds of amperes especially for use of a large electric load such as electric automobiles. Therefore, for connecting the positive and negative electrode terminals 112a and 112b of the assembled battery 100 and the positive electrode terminal 131a and the negative electrode terminal 131b of the lid 130, a metal bus bar having strong power durability and high rigidity or the like is mainly used as a connection member in place of a flexible cable such as a stranded wire.

However, a working space for attachment of the connection member is a narrow space where the lid 130 and upper surfaces 111a of the batteries 111 face each other. Further, in a case where lithium ion secondary batteries are used as the batteries 111, there is a need for a control circuit for performing active control at the time of charge-discharge, and the control circuit is provided on a main surface 130a or a back surface of the lid 130 as described in JP-A-2002-134078. Thus, particularly in a case where the control circuit is provided on the back surface of the lid 130, the working space described above is furthermore narrowed down.

Therefore, for connecting the electrode terminals on the side of the assembled battery 110 and attachment terminals (not shown) of the lid 130 exposed on the back surface of the lid 130 in the collective battery 100, delicate and careful operations are required for each of steps of positioning, temporary fixing, and final fixing, so that productivity is lowered.

As described above, in a power supply device as in the collective battery according to the conventional technique, a structure around the electrode terminals is made in a cumulated fashion, and there is a problem that the productivity is lowered.

SUMMARY OF THE INVENTION

An object of the present invention is to provide a power supply device with enhanced productivity.

A power supply device according to an aspect of the present invention includes a power storage element having an electrode terminal, and a fixing portion fixed to the power storage element on a second surface of the power storage element which is different from a first surface on which the electrode terminal is arranged, wherein the fixing portion has a connection terminal for electrically connecting the electrode terminal and an external load.

In the power supply device, the fixing portion having the connection terminal is fixed to the power storage element on the second surface of the power storage element which is different from the first surface on which the electrode terminal is arranged. That is, the fixing portion is not fixed to the power storage element on the first surface on which the electrode terminal is arranged. Thus, a working space where an operation of connecting the connection terminal and the electrode terminal is performed can be ensured. Therefore, even in a state that the fixing portion is fixed to the power storage element, the operation of connecting the connection terminal and the electrode terminal can be easily performed, so that the productivity of the power supply device can be enhanced.

A plurality of the power storage elements may be arranged to form a stack, the power supply device may further include a fastening member for fastening a pair of side surfaces of the stack opposed to each other in the arranging direction of the plurality of power storage elements, and the fastening member may be fixed to the fixing portion.

In the power supply device, the fastening member for fastening the plurality of power storage elements is fixed to the fixing portion. That is, the fastening member also serves as a member for fixing the fixing portion to the power storage elements. Thus, there is no need for newly providing a member for fixing the fixing portion to the power storage elements, so that an increase in the number of parts can be suppressed.

The power supply device may further include a managing unit for managing an operation regarding charge to or discharge from the power storage element, and the managing unit may be provided on a surface which is different from the second surface of the power storage element.

In the power supply device, the managing unit of charge-discharge of the power storage element such as a control circuit is provided on the surface which is different from the second surface of the power storage element. Thereby, the control circuit and wires can be installed in a wide place, so that a freedom degree of design can be improved. Since the control circuit is not necessarily arranged between the power storage element and the fixing portion, a configuration around the connection terminal can be simplified.

The power storage element may have the first surface as an upper surface thereof, the second surface as a side surface thereof, and also have a surface opposed to the first surface and a surface opposed to the second surface, and a distance between the first surface and the surface opposed to the first surface may be smaller than a distance between the second surface and the surface opposed to the second surface.

In the power supply device, the distance between the first surface and the surface opposed to the first surface is smaller than the distance between the second surface and the surface opposed to the second surface in the power storage element. Thereby, since size of the shorter distance in the power storage element can be set as depth size of the fixing portion, a width in the depth direction of the power supply device corresponding to the depth size can be suppressed to be short.

The fixing portion may be provided with a rib extending toward the power storage element on an inner surface thereof, and the power storage element may be in contact with an edge surface of the rib.

In the power supply device, the power storage element is in contact with the edge surface of the rib on the inner surface of the fixing portion. Thus, the power storage element can be protected from impact from an exterior of the power supply device, oscillation at the time of moving the power supply device, and the like.

The power supply device may further include a container having an opening corresponding to a shape of the fixing portion, and the fixing portion may close the opening in a state that the power storage element is accommodated in the container.

The power supply device includes the container, and the fixing portion closes the opening of the container. Thus, the fixing portion can also play a role of a lid of the container.

The container may be provided with a first rib extending toward the power storage element on a bottom surface on the inner side thereof, and the power storage element may be in contact with an edge surface of a part of the first rib.

In the power supply device, the power storage element is in contact with the edge surface of the rib on the bottom surface of the container. Thus, the power storage element can be protected from the impact from the exterior of the power supply device, the oscillation at the time of moving the power supply device, and the like.

(a) Another part of the first rib may be arranged between the two electrode terminals or (b) an edge surface of the another part may be separated from the electrode terminals.

The part of the rib on the bottom surface of the container is arranged between the electrode terminals or the edge surface is separated from the electrode terminals. Thus, the power supply device can be formed in such a manner that the rib is not brought into contact with the electrode terminals.

The container may be provided with a second rib extending toward the power storage element on a side surface on the inner side thereof.

In the power supply device, the container is provided with the rib on the inner side surface. Thus, the power storage element can be protected from the impact from the exterior of the power supply device, the oscillation at the time of moving the power supply device, and the like.

The container may be provided with the two facing second ribs on two facing side surfaces on the inner side thereof, and a gap between edge surfaces of the two facing second ribs may be substantially equal to a width of the power storage element.

The gap between the edge surfaces of the two facing ribs is substantially equal to the width of the power storage element. Thus, the power storage element can be protected from the impact from the exterior of the power supply device, the oscillation at the time of moving the power supply device, and the like.

The power supply device may include a buffer material placed in at least one of a part between the fixing portion and the power storage element and a part between the bottom surface of the container and the power storage element.

Since the power supply device is provided with the buffer material made of an elastic material such as rubber in the part between the fixing portion or the container and the power storage element, impact resistance of the power storage element can be improved.

At least one of the fixing portion and the container may be made of a resin material.

The fixing portion or the container of the power supply device is made of the resin material. Thus, processing is easily performed, the power supply device can comply with the existing standards of a storage battery, and weight of the power supply device can be reduced.

According to an aspect of the present invention, the power supply device with enhanced productivity can be provided.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Preferred embodiments of the present invention will be described hereinafter with reference to the drawings. It should be noted that each of the embodiments described herein shows one preferable specific example of the present invention. Numerical values, shapes, materials, constituent elements, arrangement positions and connection forms of the constituent elements, and the like shown in the following embodiments are not limitation of the present invention but one example.

First Embodiment

Figure 1:
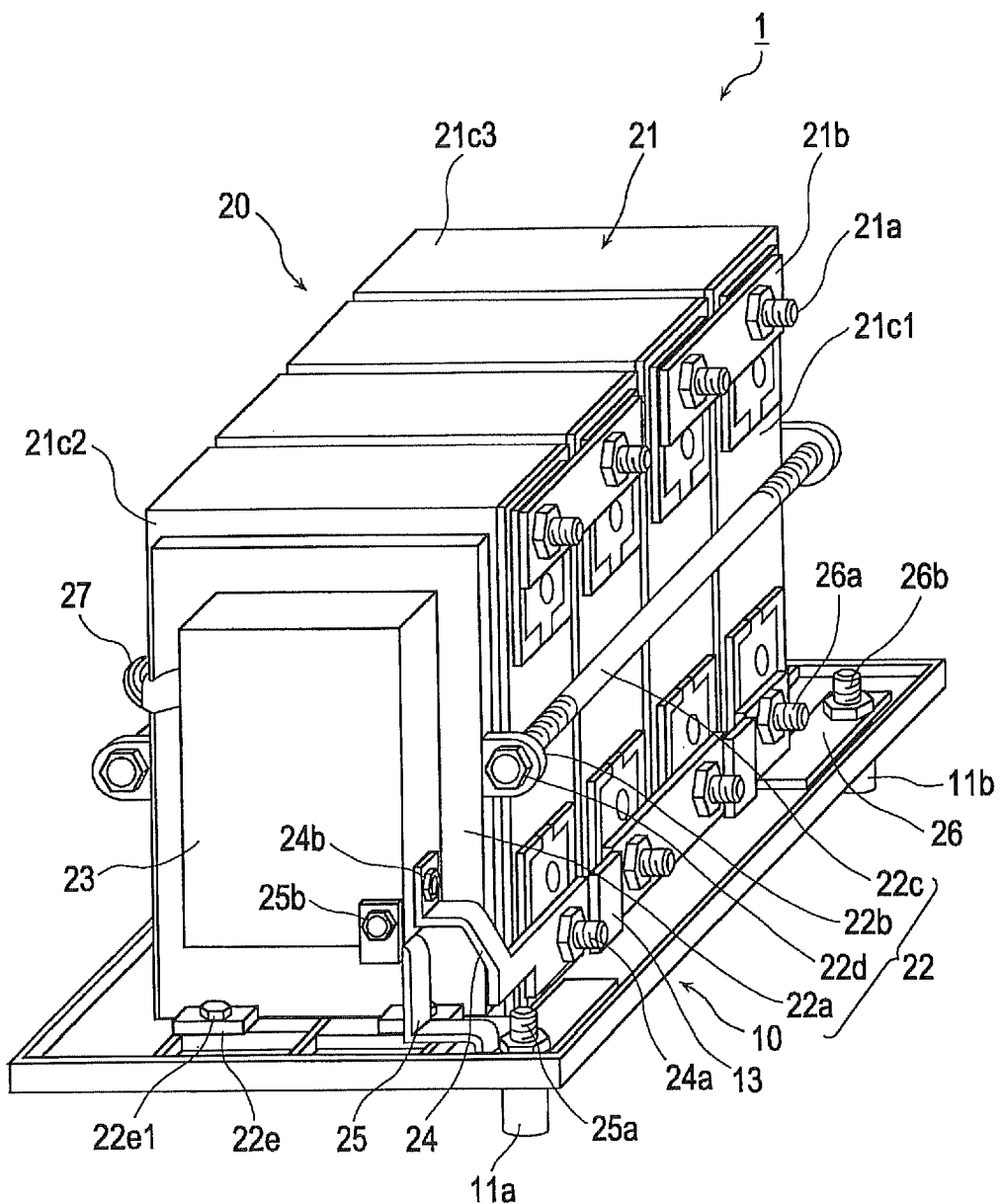
FIG. 1 is a perspective view showing a configuration of a power supply device according to a first embodiment of the present invention.
Figure 2:
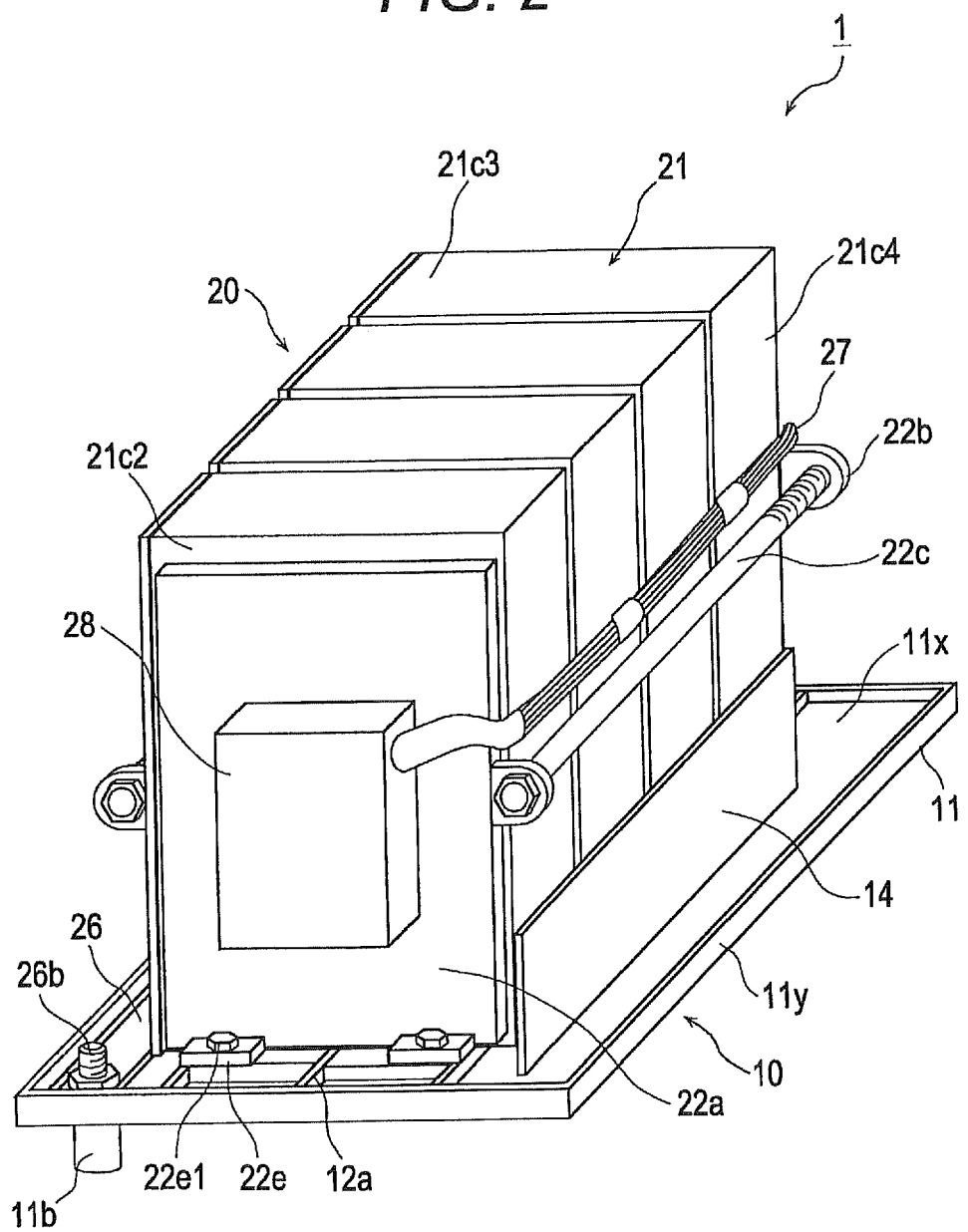
FIG. 2 is a perspective view showing the configuration of the power supply device according to the first embodiment of the present invention.
Figure 3:
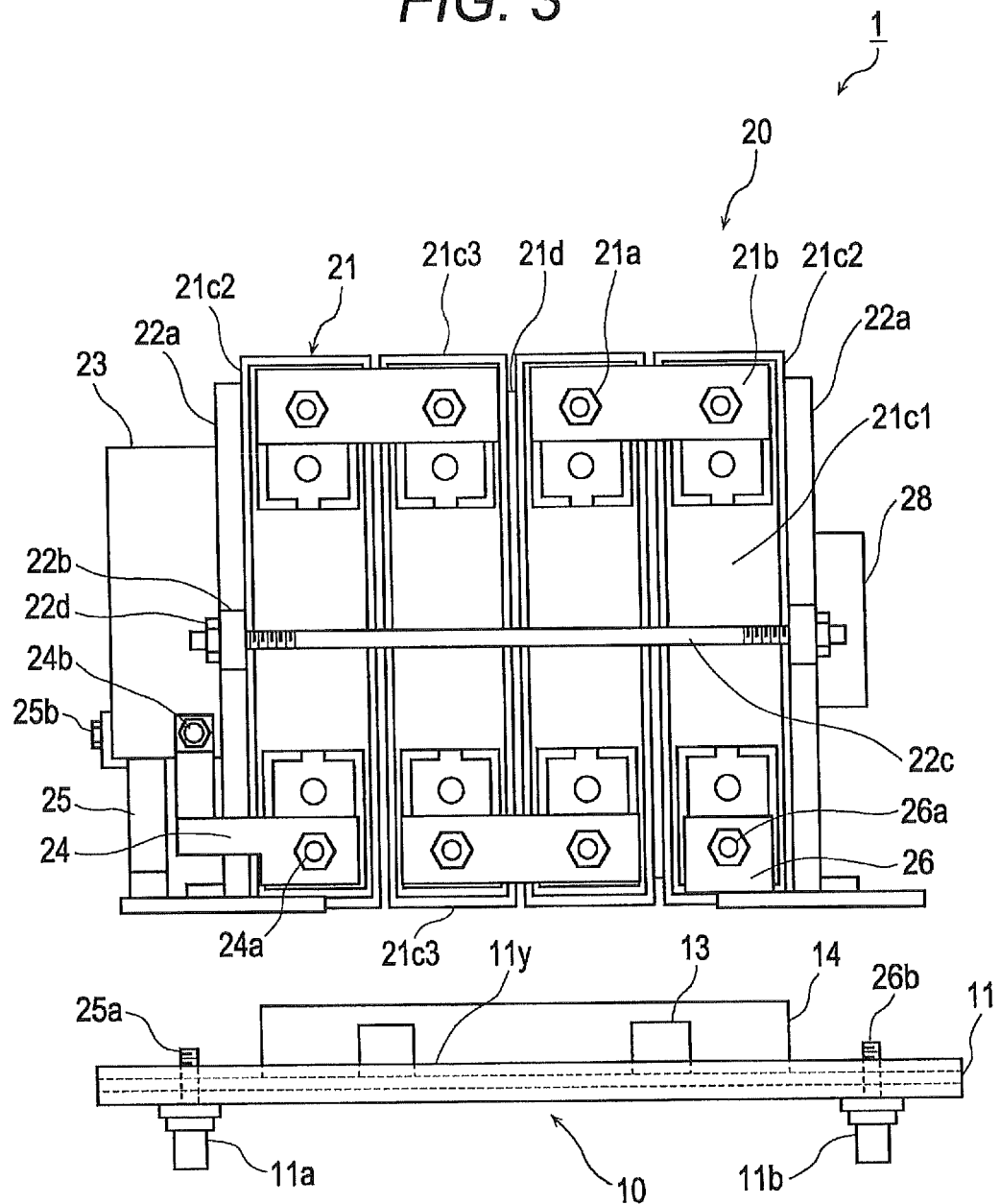
FIG. 3 is an exploded front view showing the configuration of the power supply device according to the first embodiment of the present invention.
Figure 4:
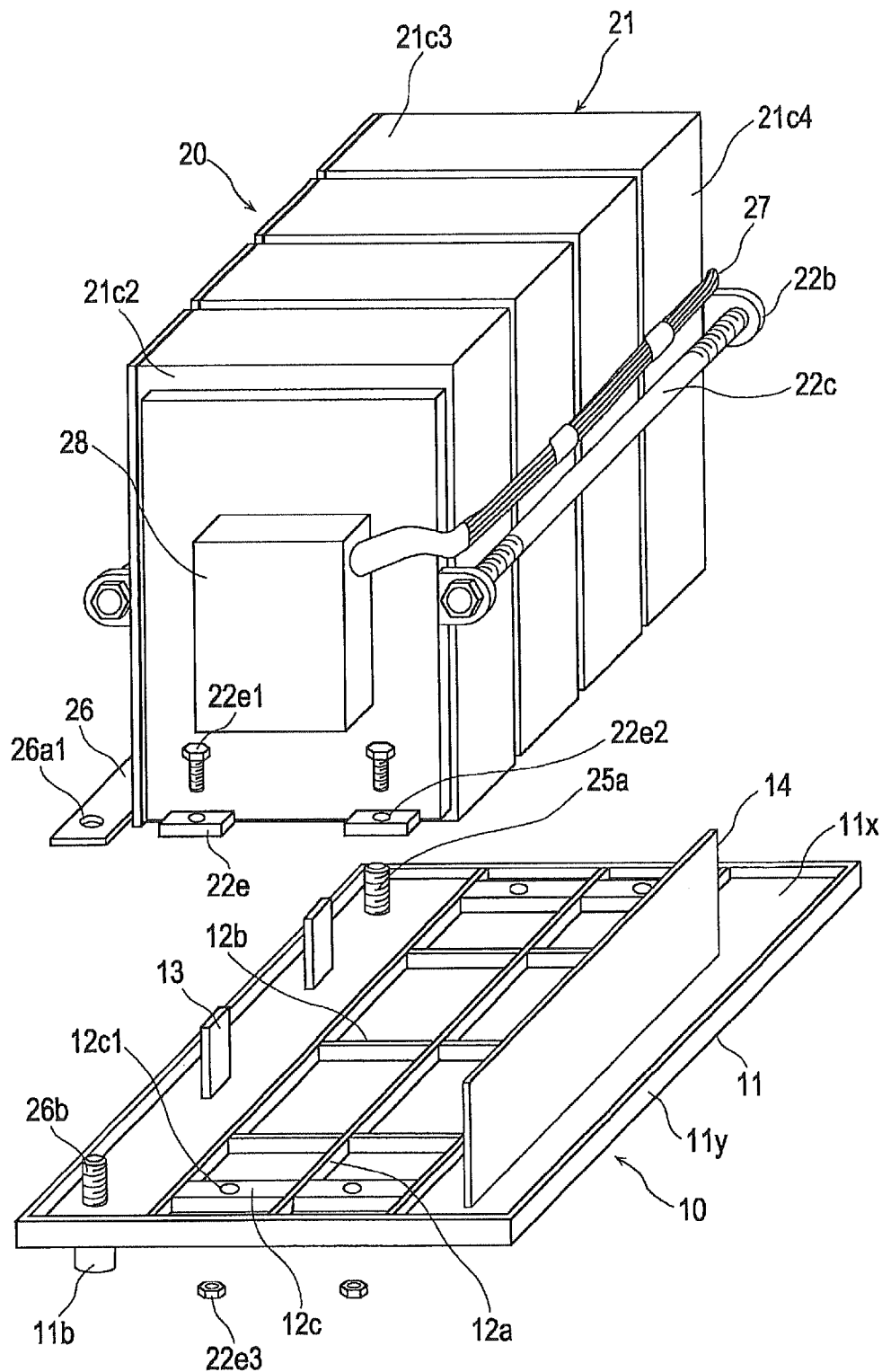
FIG. 4 is an exploded perspective view showing the configuration of the power supply device according to the first embodiment of the present invention.

FIG. 1 is a perspective view seen from a left side, showing a configuration of a power supply device 1 according to a first embodiment of the present invention. FIG. 2 is a perspective view seen from a right side. FIG. 3 is an exploded front view showing the configuration of the power supply device 1 according to the first embodiment of the present invention. FIG. 4 is an exploded perspective view seen from the right side, showing the configuration of the power supply device 1 according to the first embodiment of the present invention.

As shown in FIGS. 1 and 2, the power supply device 1 of the present embodiment is provided with a fixing portion 10, and an assembled battery 20 fixed to the fixing portion 10.

As shown in FIGS. 3 and 4, the fixing portion 10 is made of synthetic resin such as polypropylene, and provided with ribs 12a and 12b, which are provided in a base material 11 having an outer shape of a rectangular plate, and with an edge part 11y formed around the base material 11.

The ribs 12a and 12b are combined in a grid form on a main surface 11x of the base material 11 so as to play a role of a buffer material for supporting the assembled battery 20 to be mounted. That is, the ribs 12a and 12b are ribs provided on an inner surface of the fixing portion 10, the ribs extending toward the assembled battery 20, and the assembled battery 20 is in contact with edge surfaces of the ribs 12a and 12b.

Next, as shown in FIGS. 1 to 4, the assembled battery 20 is a stack in which batteries 21 having a metal exterior and a hexahedral outer shape are arranged in a single-row and four-column form in such a manner that main surfaces 21c2 face each other. In each of the batteries 21, positive and negative electrode terminals 21a are provided on an upper surface 21c1 having a rectangular outer shape, and the direction along arrangement of the electrode terminals 21a is the longitudinal direction of the upper surface 21c1.

In a case where the battery 21 is seen as a square column including the upper surface 21c1 and a bottom surface 21c4 as upper and bottom surfaces, and the main surfaces 21c2 and side surfaces 21c3 as side surfaces, a distance between the upper and bottom surfaces (corresponding to a height of the battery 21 in a case of general use) is shorter than a length of the upper surface 21c1 in the longitudinal direction. That is, in the assembled battery 20, the distance between the upper surface 21c1 and the bottom surface 21c4 opposed to the upper surface 21c1 is shorter than the distance between one of the side surfaces 21c3 and the other side surface 21c3 opposed to the one of the side surfaces 21c3.

Further, the electrode terminals 21a of the batteries 21 having different polarities from each other are connected by bus bars 21b made of stainless, aluminum, an alloy of stainless and aluminum, or other conductive metal. Thereby, the batteries 21 are connected in series so as to form a high-voltage assembled battery 20 as a whole.

Further, an outer shape of the stacked assembled battery 20 is retained by a fastening member 22. The fastening member 22 includes a pair of end plates 22a arranged so as to nip the main surfaces 21c2 of the pair of batteries 21 which are placed on the outermost sides of the columns of the assembled battery 20, and double-end bolts 22c and nuts 22d for connecting the pair of end plates 22a. That is, the fastening member 22 is a fastening member for fastening a pair of side surfaces of the assembled battery 20 opposed to each other in the arranging direction of the plurality of batteries 21.

Tabs 22b in which through holes are opened are provided in both side ends of the end plates 22a, and the tabs 22b respectively belonging to the end plates 22a face each other in a state that the pair of end plates 22a nip the assembled battery 20. The double-end bolts 22c are inserted into the through holes of the facing tabs 22b, and both ends of the double-end bolts 22c are fastened by the nuts 22d. Thereby, both ends of the assembled battery 20 are secured by fastening pressure of the end plates 22a, so that the outer shape thereof is retained.

It should be noted that as shown in FIG. 3, a buffer material 21d made of silicon rubber for example having an elastic force is inserted between the batteries 21, so as to prevent excessive stress from being added to the batteries 21 by the fastening pressure of the fastening member 22.

Next, the assembled battery 20 fastened by the fastening member 22 is fixed to the fixing portion 10 in such a manner that a surface, where the side surfaces 21c3 of the batteries 21 on the side of ends in the longitudinal direction of the upper surfaces 21c1 (lower side surfaces 21c3 in FIG. 3) are arranged, faces the fixing portion 10. In this state, the upper surfaces 21c1 on which the electrode terminals 21a are provided are perpendicular to the fixing portion 10.

Tabs 22e extending orthogonal to the end plates 22a in the direction parallel to the fixing portion 10 are provided in side ends of the end plates 22a of the fastening member 22, the side ends being on the side facing the fixing portion 10. As shown in FIG. 4, through holes 22e2 are opened in the tabs 22e, and through holes 12c1 are opened on the ribs 12c provided in the base material 11 of the fixing portion 10. By fastening bolts 22e1 by nuts 22e3 via the through holes 22e2 and 12c1 in a state that the assembled battery 20 is mounted on the fixing portion 10, the assembled battery 20 is fixed to the fixing portion 10. That is, by fixing the fastening member 22 to the fixing portion 10, the assembled battery 20 is fixed to the fixing portion 10.

Further, as shown in FIGS. 1, 3, and 4, ribs 13 standing upright along the upper surfaces 21c1 of the batteries 21 are provided on the main surface 11x of the base material 11 of the fixing portion 10. As shown in FIGS. 2 to 4, a rib 14 standing upright along the bottom surfaces 21c4 of the batteries 21 is provided on the main surface 11x. These ribs play a role of regulating movement of the assembled battery 20 on the main surface 11x. It should be noted that as shown in FIGS. 1 and 3, the ribs 13 are provided at positions where the ribs are not brought into contact with the electrode terminals 21a of the assembled battery 20.

As shown in FIG. 1, a control circuit 23 for controlling charge to and discharge from the assembled battery 20 is arranged on a surface of the end plate 22a on the left side when seen from the upper surfaces 21c1. As shown in FIG. 2, a relay circuit 28 for controlling conduction of the charge-discharge of the assembled battery 20 is arranged on a surface of the end plate 22a on the right side. It should be noted that the circuits may be fixed to the end plates 22a by a known conventional method such as fastening with bolts, screws, and the like, and bonding with an adhesive.

The control circuit 23 and the relay circuit 28 are electrically connected by a cable 27 set along the bottom surfaces 21c4 of the batteries 21. The control circuit 23, the cable 27, and the relay circuit 28 are managing units for managing an operation regarding the charge to or the discharge from the assembled battery 20, and provided on surfaces which are different from the side surfaces 21c3 of the batteries 21 on the side where the fixing portion 10 is fixed.

As shown in FIG. 1, an electrode terminal 24a on the positive electrode side for the entire assembled battery 20 among the plurality of electrode terminals 21a included in the assembled battery 20 is electrically connected to the control circuit 23 via a connection member 24 and a bolt 24b. The connection member 24 is a conductive metal member having power durability and rigidity corresponding to an electric current and voltage of the assembled battery 20 similarly to the bus bars 21b. A connection member 25 made of the same material as the connection member 24 is further attached to the control circuit 23 via a bolt 25b, and the connection member 25 is fixed onto the main surface of the base material 11 of the fixing portion 10 by fastening a bolt 25a. As shown in FIG. 3, the bolt 25a penetrates the base material 11 and is integrated with a positive electrode terminal 11a provided on a surface of the fixing portion 10. Therefore, by connecting the electrode terminal 24a, the connection members 24 and 25, and the bolt 25a, the electrode terminal 24a on the positive electrode side of the assembled battery 20 is electrically connected to the positive electrode terminal 11a of the power supply device 1.

Meanwhile, an electrode terminal 26a on the negative electrode side for the entire assembled battery 20 among the plurality of electrode terminals 21a included in the assembled battery 20 is fixed to a connection member 26. The connection member 26 is a conductive metal member similarly to the connection member 24, and by inserting a bolt 26b into a through hole 26a1, one end thereof is fixed onto the main surface of the base material 11 of the fixing portion 10 by fastening the bolt 26b. As shown in FIG. 3, the bolt 26b penetrates the base material 11 and is integrated with a negative electrode terminal 11b provided on the surface of the fixing portion 10. Therefore, by connecting the electrode terminal 26a, the connection member 26, and the bolt 26b, the electrode terminal 26a on the negative electrode side of the assembled battery 20 is electrically connected to the negative electrode terminal 11b of the power supply device 1.

The positive electrode terminal 11a and the negative electrode terminal 11b are connection terminals connected to an external load. That is, the positive electrode terminal 11a electrically connects the electrode terminal 24a and the external load, and the negative electrode terminal 11b electrically connects the electrode terminal 26a and the external load. It should be noted that the external load is an electric power load used in an exterior of the power supply device 1, for example, a device consuming the electric power.

With the above configuration, the assembled battery 20 or the battery 21 corresponds to a "power storage element". In a case where the battery 21 corresponds to the "power storage element", the assembled battery 20 corresponds to a "stack". The fixing portion 10 corresponds to a "fixing portion", and the electrode terminal 21a corresponds to an "electrode terminal". The upper surface 21c1 of the battery 21 corresponds to a "first surface", and the side surface 21c3 of the battery 21 on the side of the fixing portion 10 corresponds to a "second surface". The positive electrode terminal 11a and the bolt 25a and the negative electrode terminal 11b and the bolt 26b correspond to a "connection terminal".

The fastening member 22 corresponds to a "fastening member". The control circuit 23, the cable 27, and the relay circuit 28 correspond to a "managing unit".

The power supply device 1 of the present embodiment with the above configuration is characterized by that the fixing portion 10 and the assembled battery 20 are fixed via the side surfaces 21c3 of the batteries 21, in other words, the fixing portion and the assembled battery are fixed in such a manner that the upper surfaces 21c1 on which the electrode terminals 21a are provided do not face the fixing portion 10.

That is, as shown in FIGS. 1 and 2, in the assembled battery 20 in the power supply device 1, the upper surfaces 21c1 on which the electrode terminals 21a are provided are perpendicular to the fixing portion 10, and the electrode terminals 21a extend in the direction parallel to the fixing portion 10 so as not to be brought into contact with the fixing portion 10. Similarly, the bolts 25a and 26b provided on the fixing portion 10 extend in the direction parallel to the upper surfaces 21c1 of the batteries 21 so as not to be brought into contact with the upper surfaces 21c1.

Thereby, the electrode terminal 24a and the connection members 24 and 25, or the electrode terminal 26a and the connection member 26 are connected in a sufficiently open space. Further, a process of connecting the electrode terminals 24a and 26a of the assembled battery 20, the bolts 25a and 26b on the fixing portion 10, and the connection members 25 and 26 can be performed after finishing a process of fixing the assembled battery 20 to the fixing portion 10.

Therefore, even in a state that the fixing portion 10 is fixed to the assembled battery 20, an operation of connecting the electrode terminal 24a and the connection members 24 and 25, or the electrode terminal 26a and the connection member 26 can be promptly performed under a stable state, so that productivity of the power supply device 1 can be enhanced.

In the power supply device 1 of the present embodiment, the upper surfaces 21c1 of the batteries 21 forming the assembled battery 20 are exposed as a side surface of the assembled battery 20. Thus, even after the assembled battery 20 is fixed to the fixing portion 10, attachment, adjustment, or the like of the bus bars 21b for connecting the batteries can be easily performed.

When the assembled battery 20 is fixed to the fixing portion 10, electric power paths respectively connecting the electrode terminal 24a and the electrode terminal 26a and the positive electrode terminal 11a and the negative electrode terminal 11b (connection members 24, 25, and 26) can be shortened more than a case where the assembled battery 20 is not fixed to but separated from the fixing portion 10. Therefore, an increase in resistance in the electric power paths from the assembled battery 20 to the external load can be suppressed.

Since the assembled battery 20 is fixed to the fixing portion 10, by detaching the fixing portion 10 from a device in a case where the power supply device 1 is attached to the device by the fixing portion 10, the assembled battery 20 can be detached from the device. Therefore, an operation of replacement, maintenance, or the like of the batteries can be easily performed.

In the power supply device 1 of the present embodiment, the managing units such as the control circuit 23 can be arranged over the main surfaces 21c2 or the bottom surfaces 21c4 of the batteries 21 and further the upper surfaces 21c1 (that is, the surfaces which are different from the side surfaces 21c3 of the batteries 21 on the side of the fixing portion 10) around the assembled battery 20. Thereby, a margin of arrangement positions and arrangement areas of the circuits and wirings forming the managing units are extended, and a freedom degree of design is improved, so that a configuration in the vicinity of the connection terminals can be simplified.

Further, in the power supply device 1 of the present embodiment, by providing the tabs 22e in the end plates 22a forming the fastening member 22 for retaining the outer shape of the assembled battery 20, the assembled battery 20 is directly fixed to the fixing portion 10 by the fastening member 22. Thereby, without separately providing a member for fixing the assembled battery 20 to the fixing portion 10, the power supply device can be formed with the less number of parts.

Further, in the power supply device 1 of the present embodiment, the batteries 21 stacked as the assembled battery 20 are placed on their side so to speak, the upper surfaces 21c1 on which the electrode terminals 21a are provided serve as a front surface as shown in FIG. 3, and a height of the batteries serves as a depth of the assembled battery 20 as shown in FIG. 1 and the like.

Thereby, among size of the assembled battery 20, size of a height of the shortest battery 21 can be set as depth size of the fixing portion 10. Thus, a width in the depth direction of the power supply device 1 corresponding to the depth size can be suppressed to be short, so that downsizing of the power supply device 1 is realized.

Further, the ribs 12a and 12b combined in a grid form on the main surface 11x of the base material 11 are formed in the fixing portion 10. The ribs 12a and 12b stand upright toward the assembled battery 20. Therefore, the assembled battery 20 is supported by the ribs 12a and 12b and fixed in a state that the assembled battery is floated up from the main surface 11x. The ribs 12a and 12b function as elastic buffer materials made by injection molding for example, and protect the assembled battery 20 by preventing movement of the assembled battery 20 against impact from an exterior of the power supply device 1 and oscillation at the time of moving the power supply device.

Second Embodiment

Next, a second embodiment of the present invention will be described. Although the power supply device 1 of the first embodiment is formed only by the plate shape fixing portion 10 and the assembled battery 20, the power supply device may be realized as a configuration that the assembled battery 20 is accommodated in a container similarly to the conventional example.

Figure 5:
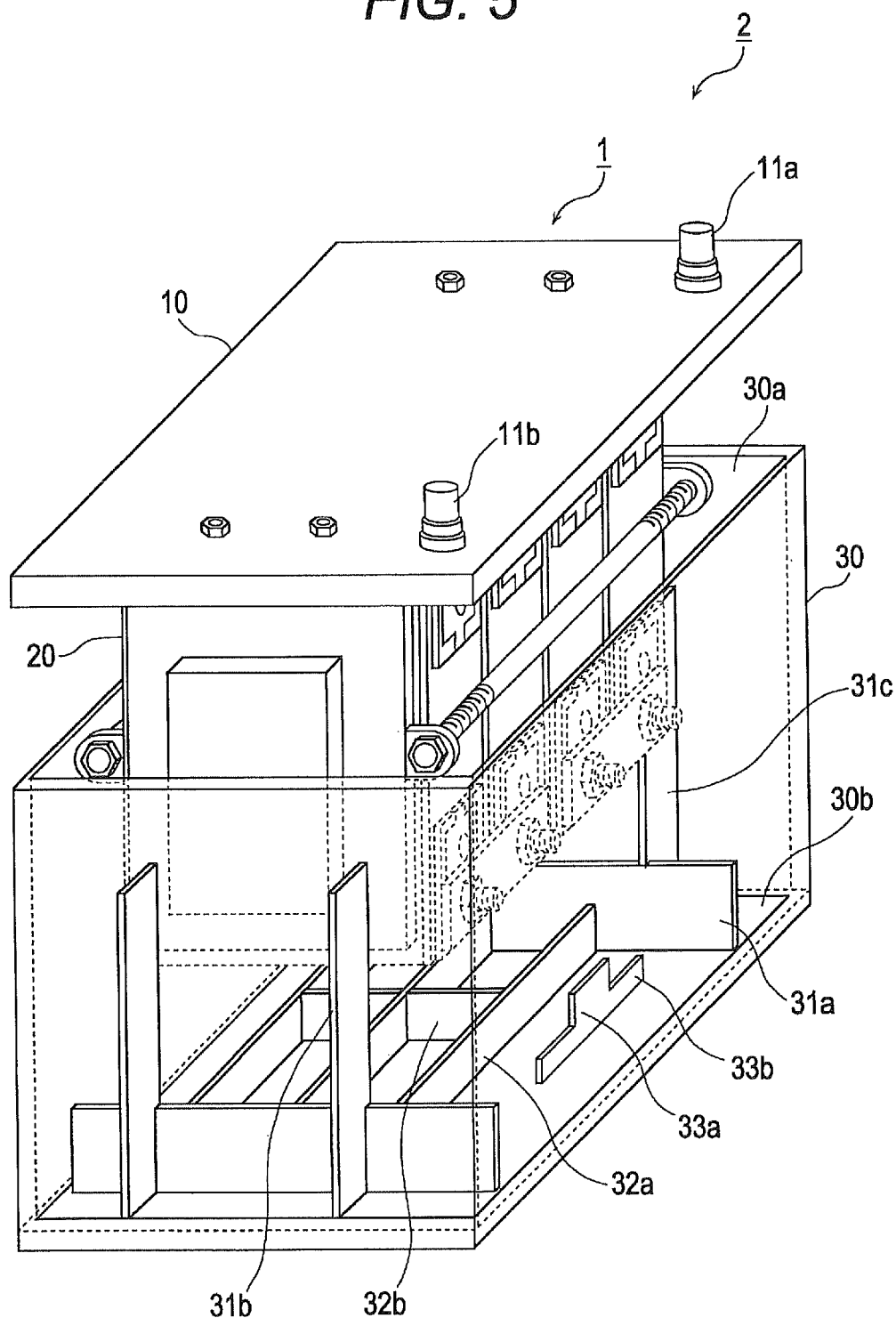
FIG. 5 is an exploded perspective view showing a configuration of a power supply device according to a second embodiment of the present invention.
Figure 6:
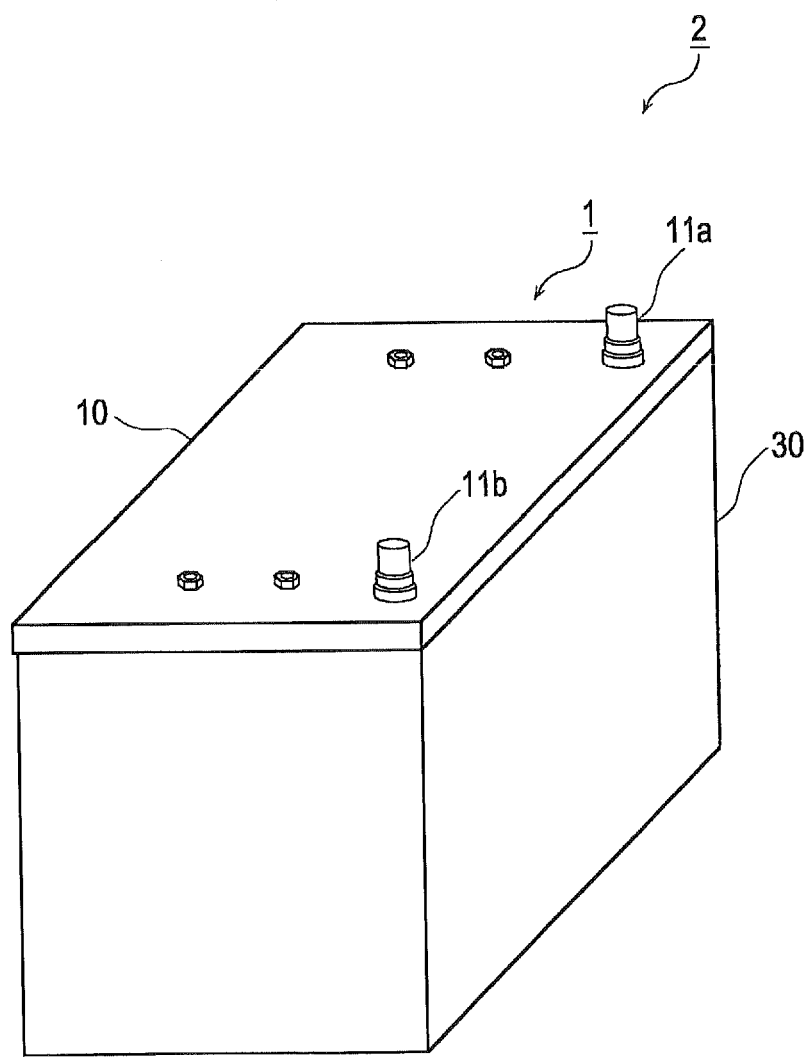
FIG. 6 is a perspective view showing the configuration of the power supply device according to the second embodiment of the present invention.
Figure 7:
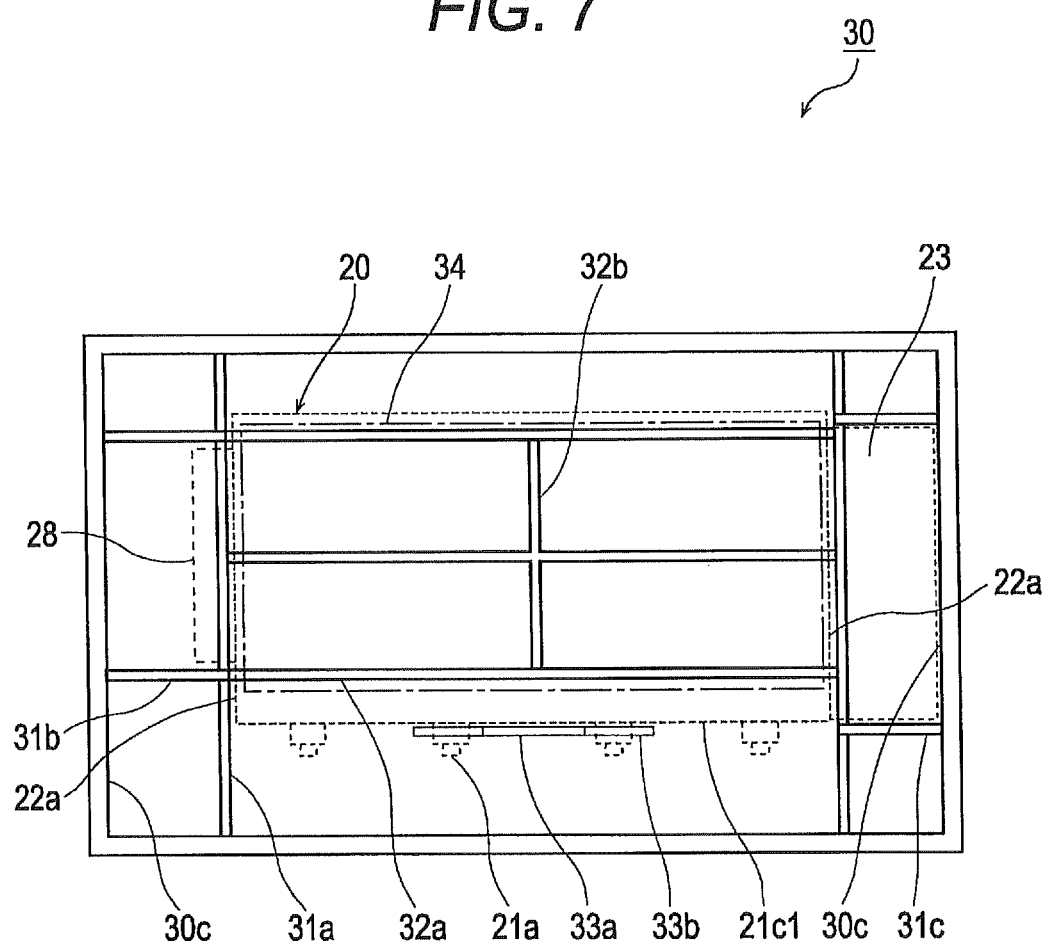
FIG. 7 is a schematic plan view of a container of the power supply device according to the second embodiment of the present invention.

FIG. 5 is an exploded perspective view showing a configuration of a power supply device 2 according to the second embodiment of the present invention. Specifically, FIG. 5 is the exploded perspective view showing the configuration of the power supply device 2 formed by combining the power supply device 1 of the first embodiment and a container 30 in which the assembled battery 20 is accommodated. It should be noted that FIG. 5 shows an internal configuration provided in the container 30 to be seen through wall surfaces of the container 30. FIG. 6 is a perspective view showing the configuration of the power supply device 2 according to the second embodiment of the present invention. FIG. 7 is a schematic plan view of the container 30 of the power supply device 2 according to the second embodiment of the present invention.

As shown in FIG. 5, the container 30 is an open box shape member made of synthetic resin, similarly to the fixing portion 10, having an opening 30a into which the assembled battery 20 can be accommodated, and a shape of a bottom surface thereof is the same as the outer shape of the fixing portion 10. That is, the opening 30a has a shape corresponding to the outer shape of the fixing portion 10, and the fixing portion 10 closes the opening 30a in a state that the assembled battery 20 is accommodated in the container 30. Therefore, in the power supply device 2, the fixing portion 10 plays a role as a lid for attachably and detachably closing the opening 30a. As shown in the perspective view of FIG. 6, the power supply device 2 can be treated as a power supply device having one casing for storing the entire assembled battery 20 after assembling.

Particularly, in the present embodiment, since the outer shape of the assembled battery 20 is retained by the fastening member 22, the container 30 itself is not required to have mechanical strength for securing the assembled battery 20. Therefore, both the container 30 and the fixing portion 10 can be made of synthetic resin, so that weight of the power supply device 2 can be reduced.

Further, in the container 30, similarly to the ribs 12a and 12b of the fixing portion 10, ribs 32a and 32b combined in a grid form are formed on a bottom surface 30b. Specifically, the ribs 32a and 32b are ribs provided on the bottom surface 30b on the inner side of the container 30, the ribs extending toward the assembled battery 20, and the assembled battery 20 is in contact with edge surfaces of the ribs 32a and 32b.

That is, edges of the ribs 32a and 32b stand upright toward the assembled battery 20. Therefore, the assembled battery 20 is supported by the ribs 32a and 32b and fixed in a state that the assembled battery is floated up from the bottom surface 30b. The ribs 32a and 32b function as elastic buffer materials made by injection molding for example and made of the same material as the container 30, and protect the assembled battery 20 by preventing movement of the assembled battery 20 against impact from an exterior of the power supply device 2 and oscillation at the time of moving the power supply device.

Further, ribs 31a, a rib 33a, and a rib 33b provided on the bottom surface 30b on the inner side of the container 30, the ribs extending toward the assembled battery 20 are formed adjacent to the electrode terminals 21a of the assembled battery 20.

As shown in FIG. 7, the ribs 31a have parallel surfaces facing the end plates 22a. The rib 33a is placed between the two electrode terminals 21a and arranged along the upper surfaces 21c1 of the assembled battery 20. The rib 33b is placed immediately below the electrode terminals 21a, and an edge surface thereof is separated while facing the electrode terminals 21a. That is, both the ribs 33a and 33b are formed so as not to be brought into contact with the electrode terminals 21a.

The ribs 31a and the ribs 33a and 33b play a role of regulating movement of the assembled battery 20 on the bottom surface 30b similarly to the ribs 13 of the fixing portion 10. It should be noted that the ribs 32a, 32b and 33a, 33b correspond to a "first rib".

Further, ribs 31b and 31c are also formed on inner side walls 30c of the container 30 so as to extend toward the assembled battery 20. The ribs 31b and 31c also play a role of protecting the assembled battery 20 from the impact from the exterior and the like similarly to the ribs 31a, 32a, 32b, 33a, 33b. As shown in FIG. 7 in particular, the ribs 31b and 31c are arranged in such a manner that edge surfaces thereof directly face the end plates 22a on the sides of the relay circuit 28 and the control circuit 23, respectively. A gap between the edge surfaces of the ribs 31b and 31c is substantially equal to a lateral width of the assembled battery 20 excluding the circuits such as the control circuit 23.

The ribs 31b and 31c are provided in such a manner that the edge surfaces go around the circuits such as the control circuit 23 so as not to be brought into contact with the circuits. Thus, impact added to the container 30 is prevented from being directly added to the circuits.

As shown in FIG. 5, in the power supply device 2, the assembled battery 20 is fixed only to the fixing portion 10, and the assembled battery 20 extends toward the bottom surface 30b. Thus, the assembled battery is prone to receive an influence of oscillation in the direction parallel to the bottom surface 30b. In the present embodiment, since the assembled battery 20 is housed between the edge surfaces of the ribs 31b and 31c, the influence of the oscillation can be suppressed. It should be noted that the ribs 31b and 31c correspond to a "second rib".

As shown in FIG. 6, since the power supply device 2 has the synthetic resin casing, processing of the outer shape is easily performed, so that the power supply device can comply with the existing standards of a storage battery. Especially, by making the power supply device in the same shape as a lead-acid battery conventionally having a synthetic resin casing, the existing item can be replaced with the power supply device 2, so that a lead-free in-car storage battery can be easily realized. The power supply device may comply with Japanese Industrial Standards or other industrial standards of countries in the world as the existing standards of the storage battery. However, by complying with the Deutsche Industrie Norme (DIN standards), the storage battery suitable for an in-car device can be realized.

Since the assembled battery 20 is fixed to the fixing portion 10 serving as the lid, by detaching the lid from the container 30, the assembled battery 20 can be easily detached. Therefore, an operation of replacement, maintenance, or the like of the assembled battery 20 can be easily performed.

As described above, according to the power supply devices 1 and 2 of the embodiments of the present invention, the fixing portion 10 and the assembled battery 20 are fixed in such a manner that the upper surfaces $21c1$ of the batteries 21 on which the electrode terminals $21a$ are provided do not face the fixing portion 10. Thus, the configuration around the electrode terminals $24a$, $26a$ can be simplified and the productivity can be enhanced.

The present invention is not limited to the above embodiments.

Figure 8:
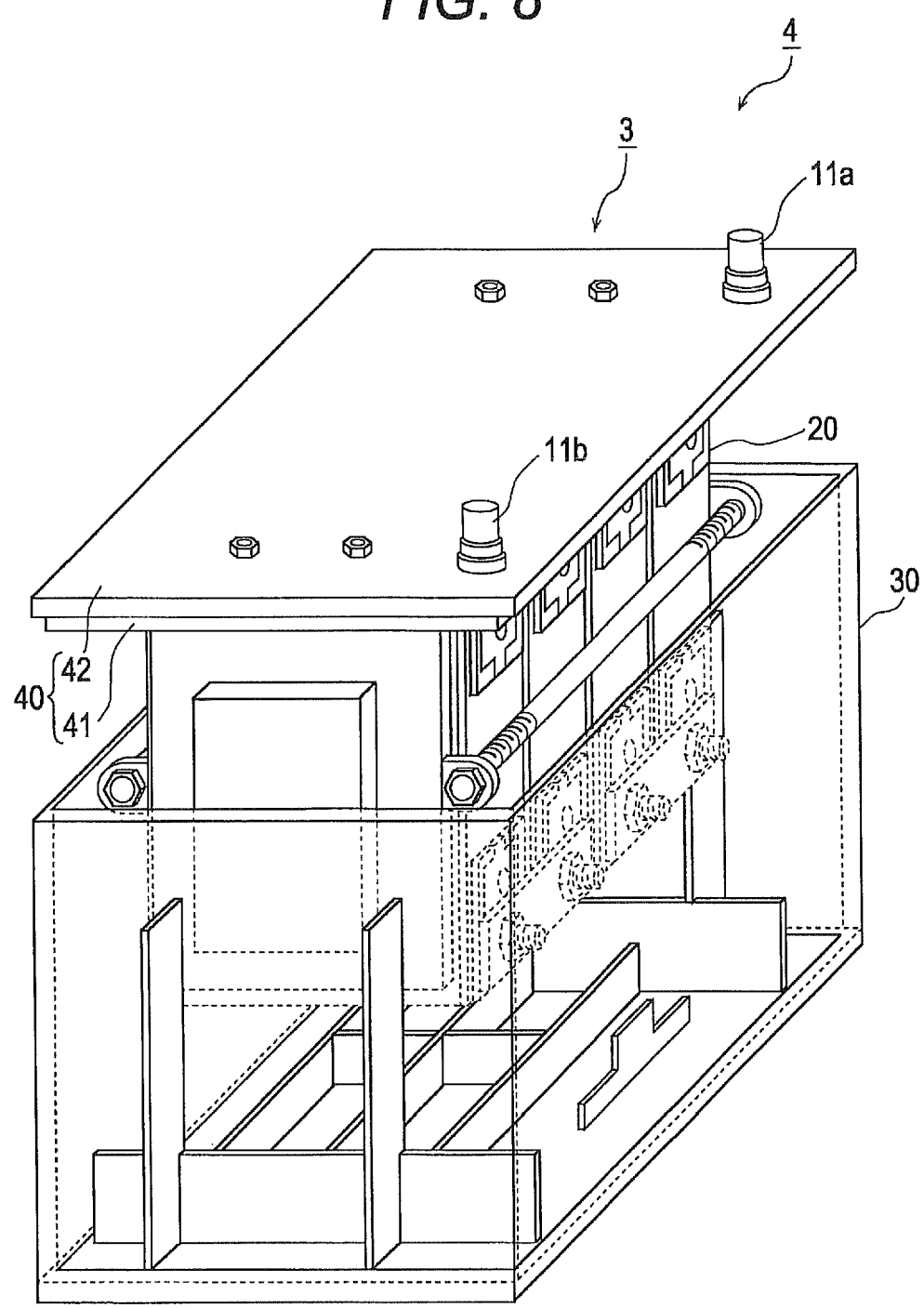
FIG. 8 is an exploded perspective view showing a configuration of a power supply device according to a modified example of the second embodiment of the present invention.
Figure 9:
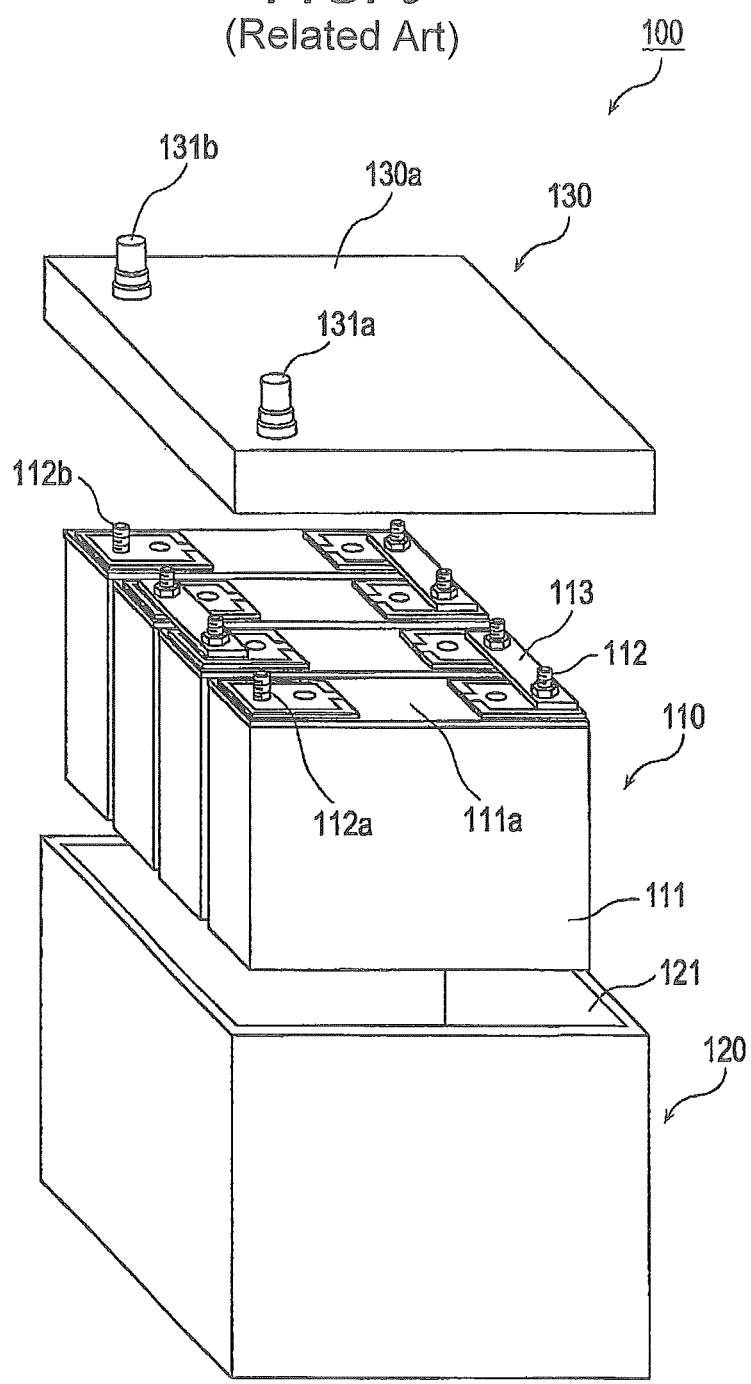
FIG. 9 is an exploded perspective view used to explain a problem of a collective battery according to the conventional technique.

For example, the fixing portion may be formed by separate bodies including a member to be fixed to the assembled battery 20 and a member having the positive electrode terminal $11a$ and the negative electrode terminal $11b$. FIG. 8 is an exploded perspective view showing a configuration of a power supply device 4 according to a modified example of the second embodiment of the present invention.

As shown in the figure, the power supply device 4 is provided with a fixing portion 40 in place of the fixing portion 10 of the second embodiment. The fixing portion 40 is provided with a fixing member 41 to be fixed to the assembled battery 20, and a connection terminal retaining member 42 having the positive electrode terminal $11a$ and the negative electrode terminal $11b$. The fixing member 41 and the connection terminal retaining member 42 are attachably and detachably connected. It should be noted that the positive electrode terminal $11a$ and the negative electrode terminal $11b$ are respectively electrically connected to the electrode terminals $24a$ and $26a$ similarly to the first and second embodiments. Since other configurations are also the same as the first and second embodiments, description thereof is omitted.

Although the part to be fixed to the assembled battery 20 and the part having the positive electrode terminal $11a$ and the negative electrode terminal $11b$ are integrated in the fixing portion 10 in the first and second embodiments, the fixing portion 40 in the present modified example is provided with the fixing member 41 and the connection terminal retaining member 42 as separate members.

It should be noted that although the present modified example shows the example that the power supply device 4 provided with the fixing portion 40 is realized, a power supply device 3 provided with the above fixing portion 40 in place of the fixing portion 10 of the first embodiment may be realized.

Thereby, the assembled battery 20 can be easily detached from the positive electrode terminal $11a$ and the negative electrode terminal $11b$, so that the operation of the replacement, the maintenance, or the like of the assembled battery 20 can be easily performed. It should be noted that the fixing member 41 and the connection terminal retaining member 42 may be connected by a known conventional method such as fastening with bolts, screws, and the like, and bonding with an adhesive.

In the above description, the assembled battery 20 is the stack in which the batteries 21 having a metal exterior and a hexahedral outer shape are arranged in a plural-column form in such a manner that the main surfaces $21c2$ having larger areas face each other as shown in FIGS. 1 and 2. However, the side surfaces $21c3$ may face each other.

Nevertheless, by making the main surfaces $21c2$ face each other, a lateral width of the power supply device 1 indicated as a length along the arranging direction of the batteries 21, that is, a gap between the positive electrode terminal $11a$ and the negative electrode terminal $11b$ can be suppressed. Thus, the main surfaces more desirably face each other. In the above description, the arranging direction of the batteries 21 is the direction parallel to the fixing portion 10. However, the arranging direction may be the direction in which the batteries are laminated perpendicularly to the fixing portion 10.

In the above description, a part between the fixing portion 10 and the assembled battery 20, or a part between the assembled battery 20 and the bottom surface $30b$ of the container 30 is supported by the ribs $12a$ and $12b$, or the ribs $32a$ and $32b$. However, a buffer material made of silicon rubber or other elastic material may be provided in the part. FIG. 7 exemplifies a configuration that a buffer material 34 is provided so as to be overlapped with the ribs $32a$ and $32b$. Thereby, impact resistance of the assembled battery 20 can be further reinforced.

In the above description, the electrode terminals $24a$, $26a$ of the assembled battery 20, the connection members 24 and 25, 26, the positive electrode terminal $11a$, and the negative electrode terminal $11b$ are connected by fastening the bolts. However, the above parts may be connected by using an arbitrary technical method such as welding, soldering, and bonding with a conductive adhesive. In the above description, the control circuit 23 is set between the electrode terminal $24a$ on the positive electrode side of the assembled battery 20 and the positive electrode terminal $11a$. However, the electrode terminal $24a$ and the positive electrode terminal $11a$ are only required to be electrically connected. A mechanical mode of the connection may be direct connection between the terminals or indirect connection via various electric circuits.

In the above description, the batteries 21 are batteries represented by lithium-ion secondary batteries. However, nickel hydride batteries or various other secondary batteries may be used as long as the batteries can be charged and discharged by an electrochemical reaction. The batteries 21 may be primary batteries. Further, the batteries 21 may be power storage elements of a type for directly storing the electricity as an electric load such as electric double layer capacitors. In sum, the batteries 21 are not limited by a specific type as long as the batteries are power storage elements capable of storing the electricity.

In the above description, the outer shape of the fixing portion 10 is rectangular. However, the outer shape may be an arbitrary shape such as a circle and a polygon, and the shape of the bottom surface of the container 30 may be an arbitrary shape corresponding to the above shape. Although the fixing portion 10 and the container 30 are made of synthetic resin of the same kind, the fixing portion and the container may be made of different materials from each other. The fixing portion 10 or the container 30 may be made of metal or other materials.

Although the batteries 21 forming the assembled battery 20 have a metal hexahedral outer shape, the batteries may have a cylindrical shape. Although the assembled battery 20 is the stack formed by four batteries in a single-row and four-column form, the assembled battery may be a stack formed by combining the arbitrary number of rows and columns. Further, only a single battery 21 may be provided as the power storage element.

Although all the upper surfaces 21c1 of the batteries 21 forming the assembled battery 20 are arranged in the same direction, at least a part thereof may be arranged in the different direction. Further, the power supply device may be realized by combination of the single battery 21 and the fixing portion 10. In sum, the power supply device is not limited by the number, the shape, or other specific configuration of the power storage element.

In conclusion, including the modes described above, the present invention may be implemented by adding various changes to the above embodiments without departing from the gist thereof.

What is claimed is:

1. A power supply device comprising:
    a power storage element having a hexahedral outer shape, and including a first surface and positive and negative electrode terminals formed on the first surface;
    a fixing portion fixed to the power storage element on a second surface of the power storage element which is different from the first surface; and
    a container having an opening corresponding to a shape of the fixing portion, the fixing portion closing the opening in a state that the power storage element is accommodated in the container,
    wherein the fixing portion includes positive and negative connection terminals protruding from an outer surface of the fixing portion for electrically connecting the positive and negative electrode terminals to an external load.

2. The power supply device according to claim 1, wherein the power storage element comprises a plurality of power storage elements which are arranged to form a stack,
    the power supply device further comprises a fastening member for fastening a pair of side surfaces of the stack opposed to each other in the arranging direction of the plurality of power storage elements, and
    the fastening member is fixed to the fixing portion.

3. The power supply device according to claim 1, further comprising a managing unit for managing an operation regarding charge to or discharge from the power storage element,
    wherein the managing unit is provided on a third surface of the power storage element which is different from and extends perpendicularly to the first and second surfaces.

4. The power supply device according to claim 1, wherein the power storage element has the first surface as an upper surface thereof, the second surface as a side surface thereof, and also has a surface opposed to the first surface and a surface opposed to the second surface, and
    a distance between the first surface and the surface opposed to the first surface is smaller than a distance between the second surface and the surface opposed to the second surface.

5. The power supply device according to claim 1, wherein the fixing portion is provided with a rib extending toward the power storage element on an inner surface thereof, and
    the power storage element is in contact with an edge surface of the rib.

6. The power supply device according to claim 1, wherein the container is provided with a first rib extending toward the power storage element on a bottom surface on the inner side thereof, and
    the power storage element is in contact with an edge surface of a part of the first rib.

7. The power supply device according to claim 6, wherein the container comprises a second rib extending toward the power storage element on the bottom surface on the inner side of the container, the second rib being arranged between two electrode terminals of the positive and negative electrode terminals, and an edge surface of the second rib being separated from the two electrode terminals.

8. The power supply device according to claim 6, wherein the container is provided with a second rib extending toward the power storage element on a side surface on the inner side thereof.

9. The power supply device according to claim 8, wherein the second rib comprises two facing second ribs formed on two facing side surfaces on the inner side thereof, and a gap between edge surfaces of the two facing second ribs is substantially equal to a width of the power storage element.

10. The power supply device according to claim 1, further comprising a buffer material placed in at least one of a part between the fixing portion and the power storage element and a part between the bottom surface of the container and the power storage element.

11. The power supply device according to claim 1, wherein at least one of the fixing portion and the container is made of a resin material.

12. The power supply device according to claim 3, wherein an area of the third surface is greater than an area of the first surface and is greater than an area of the second surface.

13. The power supply device according to claim 3, further comprising:
    a connection member which connects the managing unit to an inner surface of the fixing portion.

14. The power supply device according to claim 2, wherein the fixing portion comprises a plurality of ribs formed on the inner surface of the fixing portion and extending toward the power storage element, and
    wherein the fastening member comprises a pair of plates which are connected to the pair of side surfaces of the stack, and to the plurality of ribs.

* * * * *